US011377119B2

(12) United States Patent
Zhu et al.

(10) Patent No.: US 11,377,119 B2
(45) Date of Patent: Jul. 5, 2022

(54) DRIFTING CORRECTION BETWEEN PLANNING STAGE AND CONTROLLING STAGE OF OPERATING AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Fan Zhu, Sunnyvale, CA (US); Xin Xu, Beijing (CN); Qi Kong, Sunnyvale, CA (US); Yuchang Pan, Beijing (CN); Feiyi Jiang, Beijing (CN); Liangliang Zhang, San Jose, CA (US); Jiaming Tao, Sunnyvale, CA (US); Haoyang Fan, Sunnyvale, CA (US); Hui Jiang, Beijing (CN)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 1005 days.

(21) Appl. No.: 16/066,295

(22) PCT Filed: May 18, 2018

(86) PCT No.: PCT/CN2018/087521
§ 371 (c)(1),
(2) Date: Jun. 26, 2018

(87) PCT Pub. No.: WO2019/218353
PCT Pub. Date: Nov. 21, 2019

(65) Prior Publication Data
US 2021/0179140 A1 Jun. 17, 2021

(51) Int. Cl.
*B60W 60/00* (2020.01)
*B60W 10/20* (2006.01)
*B60W 50/02* (2012.01)

(52) U.S. Cl.
CPC ........ *B60W 60/0015* (2020.02); *B60W 10/20* (2013.01); *B60W 50/0205* (2013.01); *B60W 2050/0215* (2013.01)

(58) Field of Classification Search
None
See application file for complete search history.

(56) References Cited

U.S. PATENT DOCUMENTS

2010/0191461 A1 7/2010 Zeng
2010/0228420 A1* 9/2010 Lee .................... B62D 15/0255
701/26

(Continued)

FOREIGN PATENT DOCUMENTS

EP 2637072 9/2013

*Primary Examiner* — Tamara L Weber
(74) *Attorney, Agent, or Firm* — Womble Bond Dickinson (US) LLP

(57) ABSTRACT

In one embodiment, a lateral drifting error is determined based on at least a current location of an ADV. The lateral drifting error is segmented into a first drifting error and a second drifting error using a predetermined segmentation algorithm. A planning module plans a path or trajectory for a current driving cycle (e.g., planning cycle) to drive the ADV from the current location for a predetermined period of time. The planning module performs a first drifting error correction on the trajectory by modifying at least a starting point of the trajectory based on the first drifting error to generate a modified trajectory. A control module controls the ADV to drive according to the modified trajectory, including performing a second drifting error correction based on the second drifting error.

20 Claims, 9 Drawing Sheets

(56) References Cited

U.S. PATENT DOCUMENTS

| | | | |
|---|---|---|---|
| 2012/0121161 A1* | 5/2012 | Eade ................... | G05D 1/0253 |
| | | | 382/153 |
| 2014/0214265 A1* | 7/2014 | Ashton ................ | G07C 5/0816 |
| | | | 701/33.5 |
| 2018/0164827 A1* | 6/2018 | Chu ..................... | G05D 1/0248 |

* cited by examiner

DRIFTING CORRECTION BETWEEN PLANNING STAGE AND CONTROLLING STAGE OF OPERATING AUTONOMOUS DRIVING VEHICLES

TECHNICAL FIELD

Embodiments of the present disclosure relate generally to operating autonomous vehicles. More particularly, embodiments of the disclosure relate to zero drifting autonomous driving of autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, drifting is a series problem that has a significant impact on planning and control for an autonomous driving vehicle (ADV). Drifting can be caused by a variety of factors including, but are not limited to, tire wear and tear, wheel alignment, tire pressure, road condition, etc. Such drifting may cause the accuracy of the planning and control of the ADV. Feedback for detecting drifting is a critical input for controlling an ADV. However, the ability of obtaining an accurate feedback error in time is low, particularly with low-cost equipment (e.g., without high-definition map or localization). There has been a lack of accurate and efficient way to consider the drifting of an ADV when planning a path.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
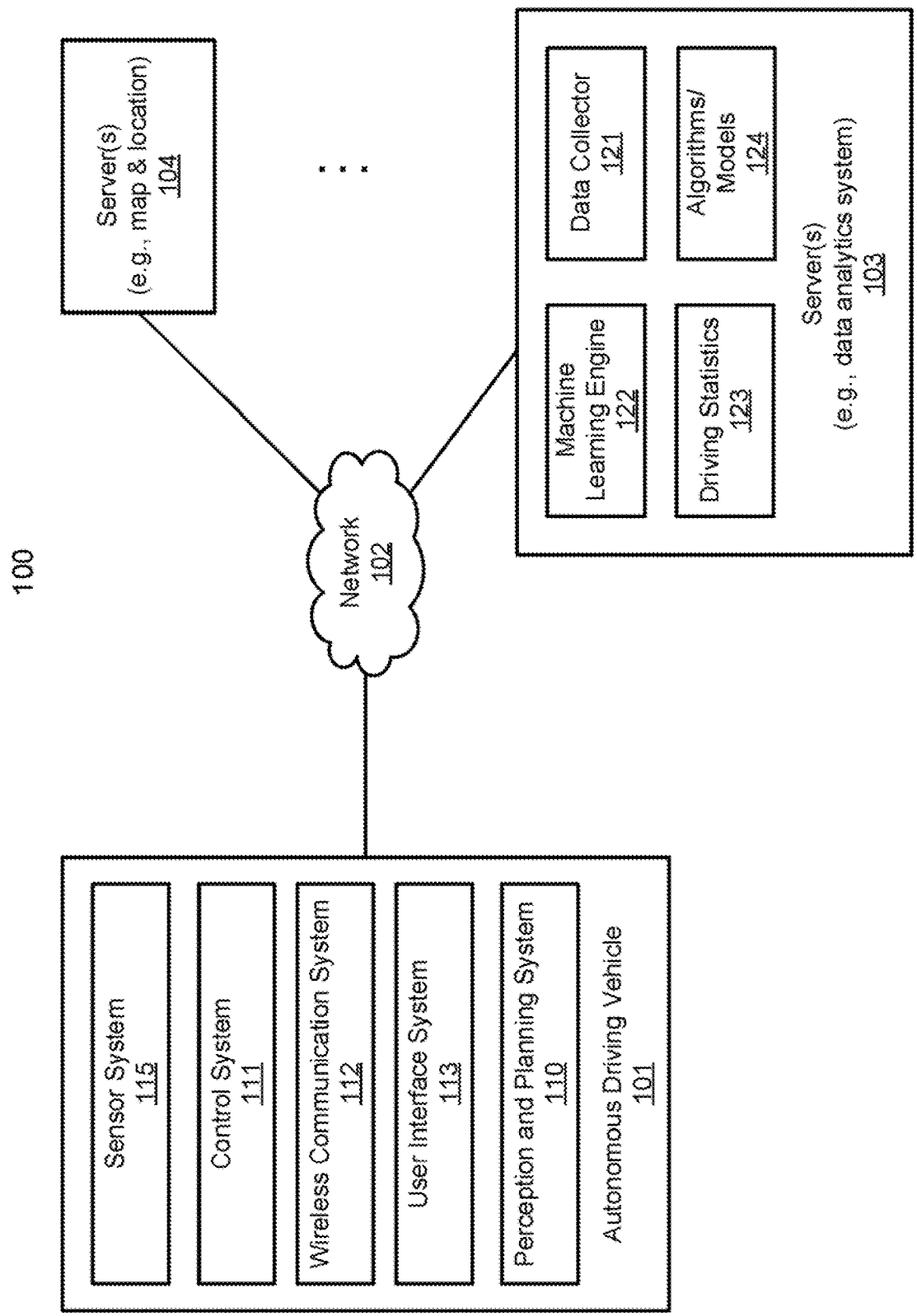
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Typically, autonomous driving processes are performed on a planning cycle or driving cycle basis (e.g., a 100 to 200 millisecond period), which will be described in details further below. For each of the driving cycles, a path is planned for a next predetermined distance or a predetermined time period. At the end of each driving cycle, a new path is planned for a new driving cycle for an ADV. According to one embodiment, when planning a path for a current driving cycle, which is utilized to control the ADV to drive for a next predetermined period of time, a drifting error of the ADV incurred by the previous driving cycle is determined during the planning stage. The drifting error is segmented into two parts using a predetermined segmentation or partition algorithm. A drifting correction is performed during planning a trajectory based on the first part of the drifting error. At least a starting point of the path planned for the current driving cycle is modified or compensated based on the drifting correction. The trajectory and the second part of the drifting error are utilized during a control stage. A second drifting correction is performed during the control stage based on the second part of the drifting error. As a result, the ADV can drive according to a path that is closer to an ideal situation, i.e., without drifting. By periodically compensating the drifting of the ADV during the planning stage and the control stage, the ADV can drive closer to the planned path in longer run.

According to one embodiment, a lateral drifting error is determined based on at least a current location of an ADV. The lateral drifting error is segmented into a first drifting error and a second drifting error using a predetermined segmentation algorithm. A planning module plans a path or trajectory for a current driving cycle (e.g., planning cycle) to drive the ADV from the current location for a predetermined period of time. The planning module performs a first drifting error correction on the trajectory by modifying at least a starting point of the trajectory based on the first drifting error to generate a modified trajectory. A control module controls the ADV to drive according to the modified trajectory, including performing a second drifting error correction based on the second drifting error.

In one embodiment, in determining the lateral drifting error, the current location of the ADV is determined based on sensor data obtained from a number of sensors mounted on the ADV. An expected location of the ADV is determined based on the trajectory generated from a previously planning cycle. The lateral drifting error is calculated based on a difference between the current location and the expected location of the ADV. In performing a second drifting error correction, a steering control command is generated based on the second drifting error from a reference point along the modified trajectory. A heading direction of the ADV is modified based on the steering control command, such that the ADV moves according to the modified heading direction to compensate the second drifting error.

In one embodiment, the second drifting error is obtained by multiplying lateral drifting error with a predetermined percentage and the first drifting error is then calculated based on the lateral drifting error and the second drifting error. In a particular embodiment, if the second drifting error is greater than a first predetermined threshold, the second drifting error is assigned with the first predetermined threshold as an upper limit. If the second drifting error is less than a second predetermined threshold, the second drifting error is assigned with the second predetermined threshold as a lower limit. In one embodiment, the upper limit and the lower limit are approximately 10 centimeter (cm) and −10 cm respectively. Thus, the second drifting error utilized to perform a drifting error correction during the control stage is limited in a range of +/−10 cm. The predetermined percentage is approximately 10%.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
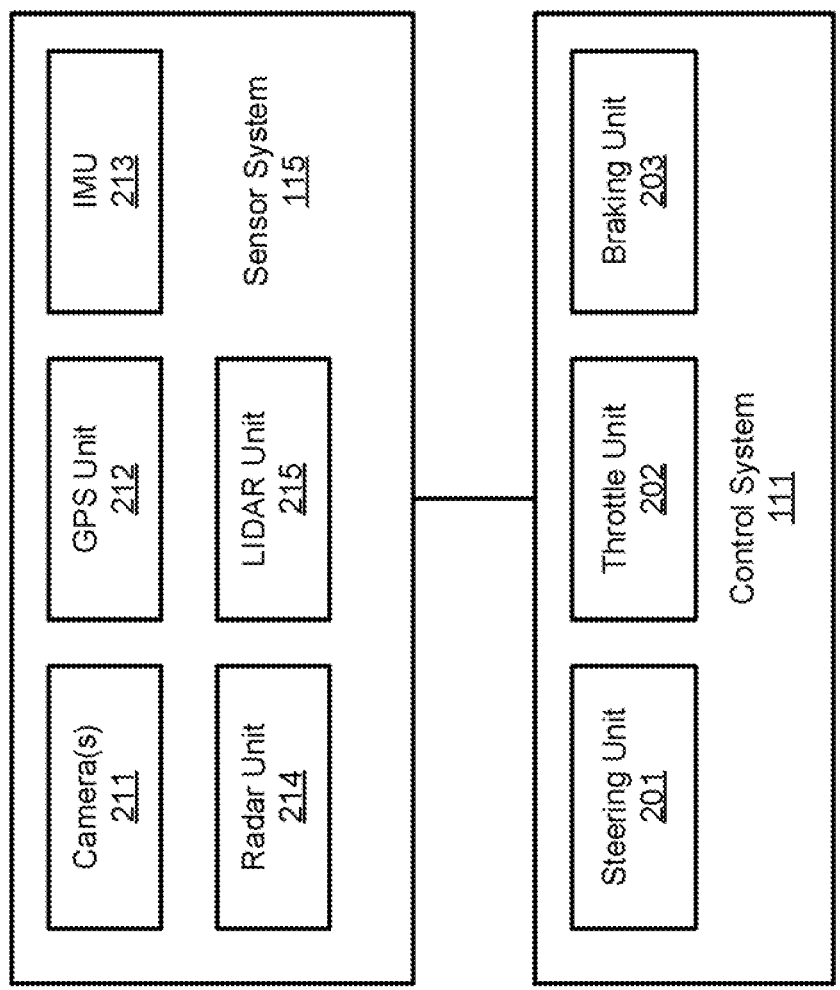
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 include an algorithm to detect and calculate a lateral drifting error of an ADV between a previous driving cycle and a current driving cycle. Algorithms 124 may further include an algorithm to segment a lateral drifting error into at least two parts. The first part is utilized by a planning module to perform a first drifting error correction during the planning stage, while the other part is utilized by a control module to perform a second drifting error correction during the control stage of the autonomous driving. Algorithms 124 can then be uploaded onto an ADV to be utilized during the real-time autonomous driving for drifting correction.

Figure 3A:
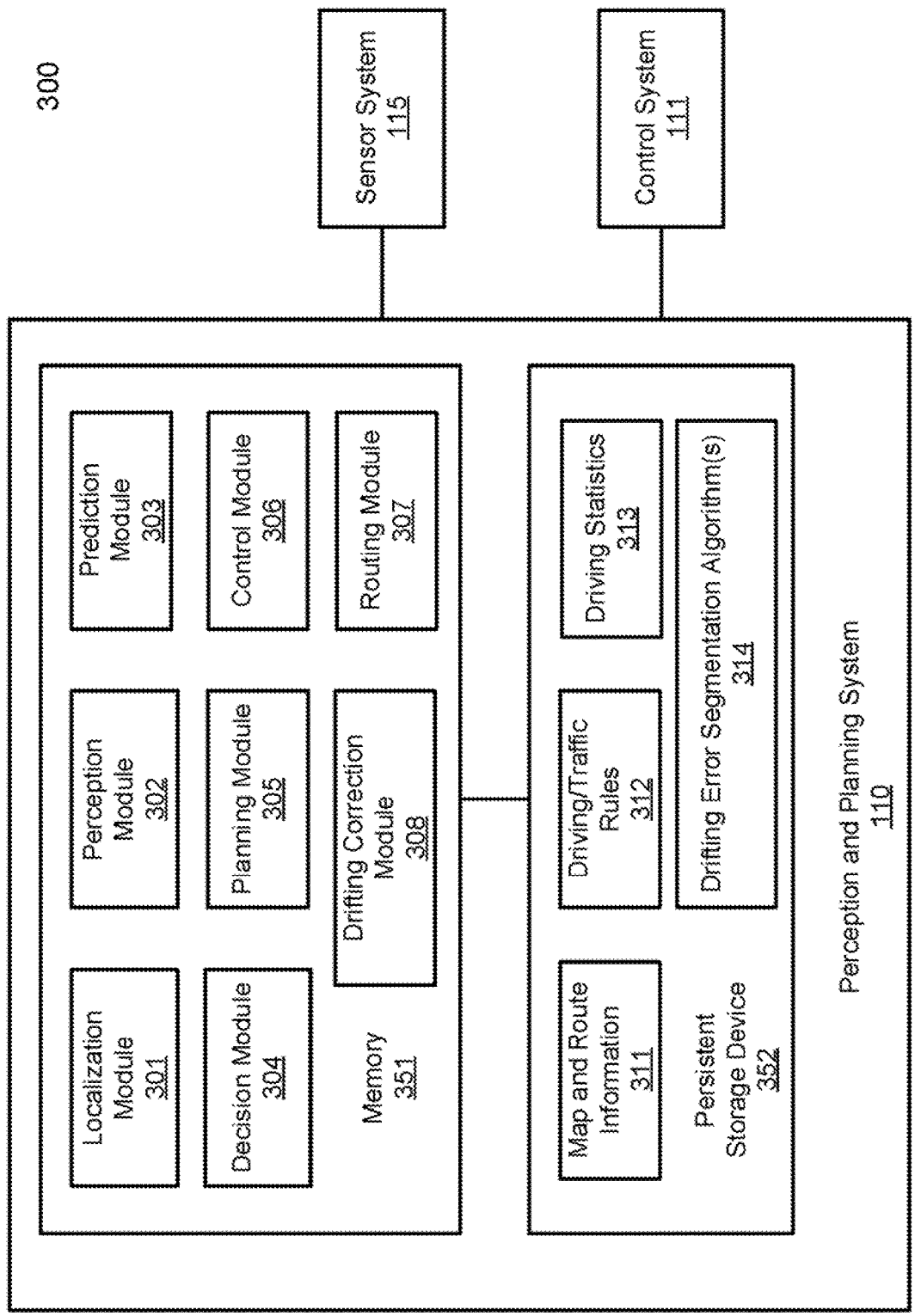
FIGS. 3A-3B are block diagrams illustrating an example of a perception and planning system used with an autonomous vehicle according to one embodiment.
Figure 3B:
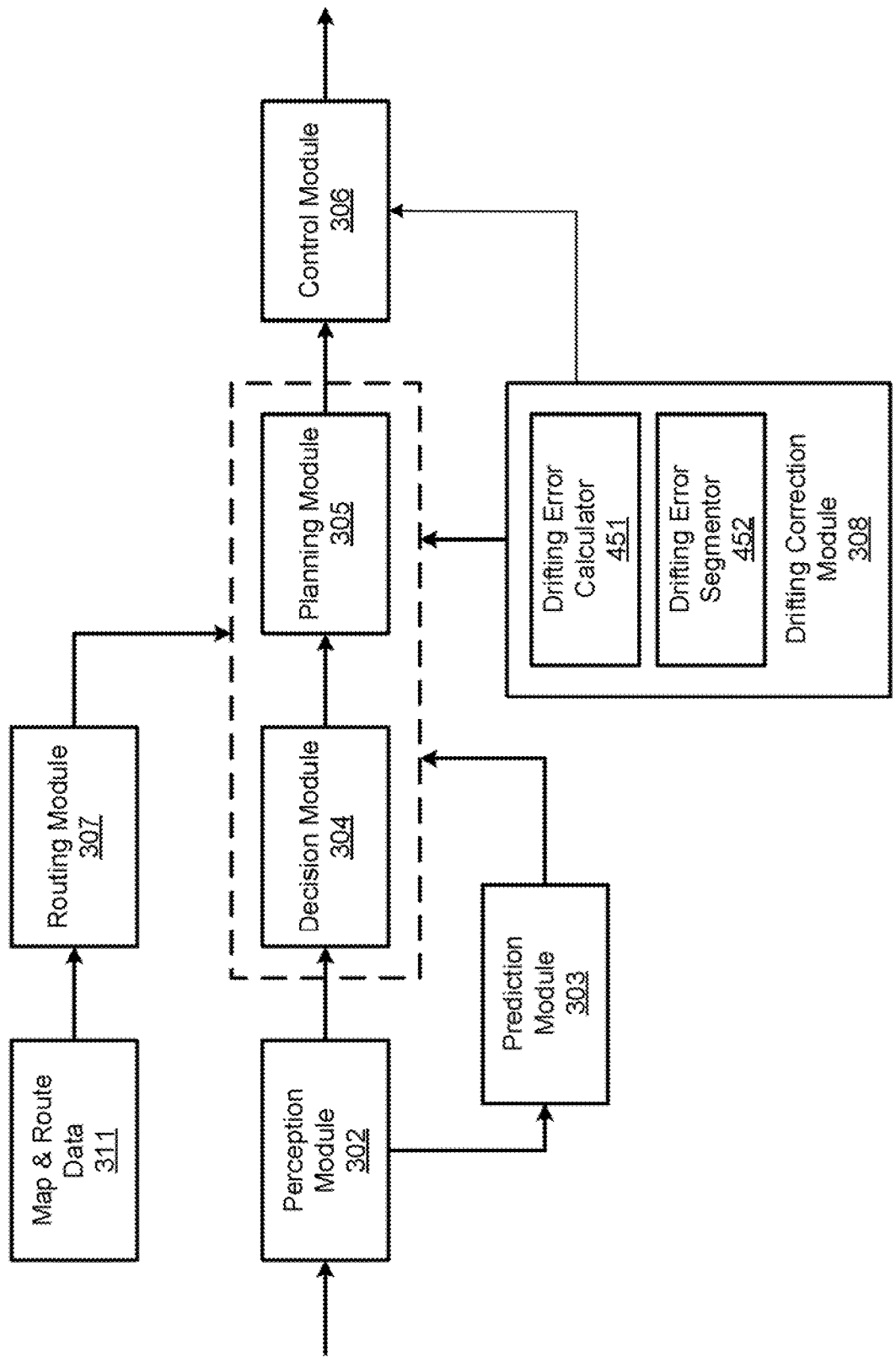

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and drifting correction module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, when planning a path for a current driving cycle (or planning cycle) for an ADV, a current location of the ADV based on sensor data provided by a variety of sensors mounted on the ADV (e.g., LIDAR, RADAR, cameras). The current location of the ADV may be determined by localization module 301 and/or perception module 302. Planning module 305 then plans a path for the current driving cycle to allow control module 306 to drive the ADV from the current location for a predetermined period of time. The path may be generated based on perception data perceiving a driving environment of the ADV, which may be determined based on the sensor data.

In one embodiment, during the planning, drifting correction module 308 is invoked to determine an expected location of the ADV that was calculated based on a previous path/trajectory. The functionality of drifting correction module 308 may also be implemented as a part of planning module 305 and/or control module 306. The previous path may be generated by planning module 305 during a previous driving cycle (e.g., the last driving cycle). The expected location of the ADV is the target location of the previous path if the ADV drove without any drifting in an ideal driving condition. However, due to a variety of factors as described above, the actual location of the ADV (e.g., the current location of the ADV of the current driving cycle) can be different from the expected location expected from the prior driving cycle, for example, due to drifting errors.

Drifting correction module 308 then calculates a drifting error dynamically based on the expected location and the current location of the ADV. For example, drifting correction module 308 may calculate the lateral drifting error based on a difference between the current location and the expected location of the ADV in a lateral dimension. Such a lateral drifting error can be different from time to time dependent upon the specific driving environment at different points in time (e.g., road condition, weather condition, tire pressure, wheel alignment, etc.). Based on the lateral drifting error, planning module 305 may modify at least a starting point of the path/trajectory for the current driving cycle to generate a modified path. Control module 306 then controls the ADV according to the modified path for the current driving cycle, for example, by issuing proper control commands (e.g., throttle, brake, steering commands) at different points in time along the modified path.

Note that the information concerning the past paths and expected locations may be maintained as a part of driving statistics 313. In addition, as described above, during the autonomous driving of the ADV, the locations, speeds, and heading directions of the ADV along the prior paths may be captured and stored as a part of driving statistics 313. The driving statistics 313 can be utilized during the path planning of subsequent driving cycles.

In one embodiment, the lateral drifting error may be determined based on sensor data provided by sensor system 115 in view of the driving statistics 313. Based on the lateral drifting error, drifting correction module 308 further segments the lateral drifting error into a first drifting error and a second drifting error, for example, using a predetermined drifting error segmentation algorithm 314. The first drifting error is utilized by planning module 305 to perform a first drifting error correction during the planning stage. The second drifting error is utilized by control module 306 to perform a second drifting error correction during the control stage.

Figure 4:
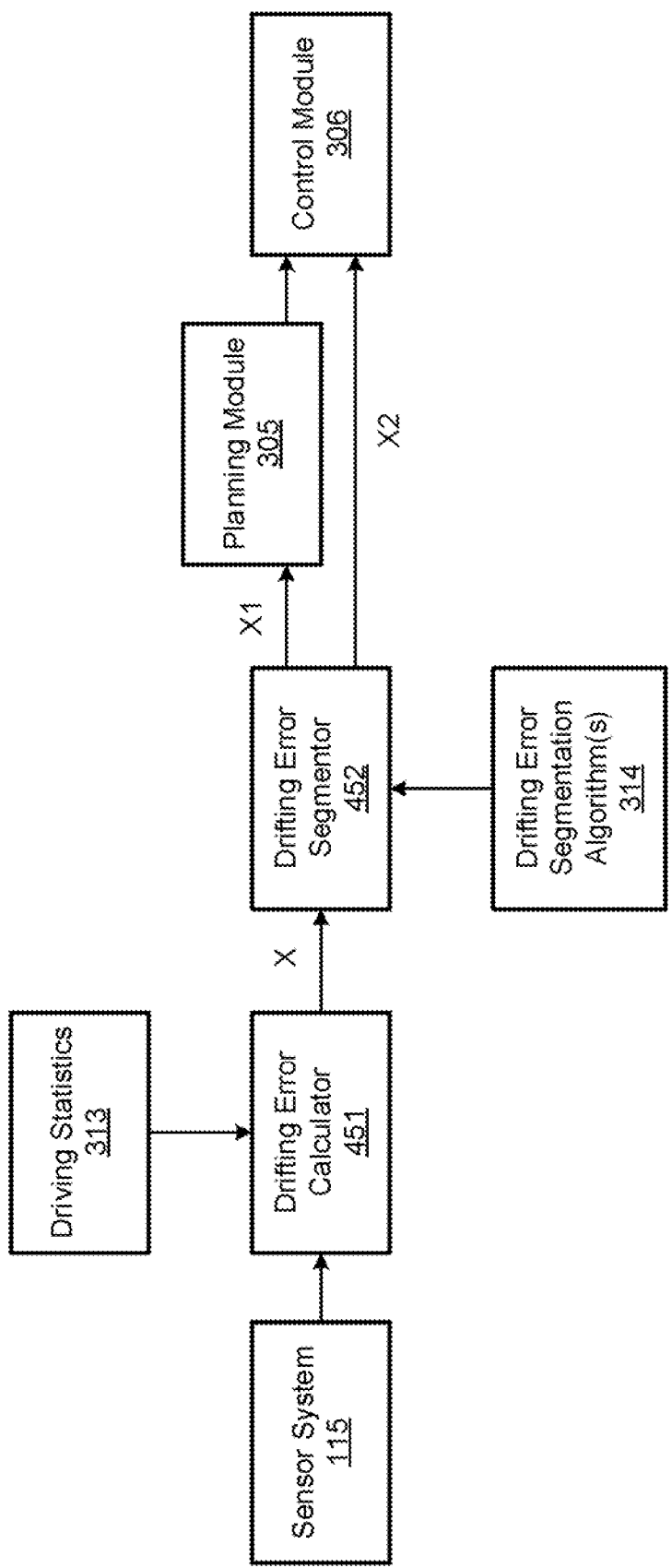
FIG. 4 is a diagram illustrating a process of drifting error correction according to one embodiment.

Referring now to FIG. 4, according to one embodiment, drifting correction module 308 includes a drifting error calculator 451 and a drifting error segmentor or segmentation module 452. Based on sensor data provided by sensor system 115 and driving statistics 313, drifting error calculator 451 calculates a lateral drifting error. In one embodiment, drifting error calculator 451 determines a current location of the ADV based on sensor data or based on localization data provided by localization module 301. The drifting error calculator 451 then calculates the lateral drifting error (X) based on a difference between the current location of the ADV and an expected location of the ADV. The expected location of the ADV was determined during planning of a previous planning cycle, which may be maintained as a part of driving statistics 313. The expected location may be obtained from a reference point corresponding to the current time of a trajectory generated during the previous planning cycle.

In one embodiment, drifting error segmentor 452 segments the lateral drifting error X into a first drifting error X1 and a second drifting error X2. The first drifting error X1 is utilized by planning module 305 to perform a first drifting error correction (also simply referred to as drifting correction) during the planning stage, and the second drifting error X2 is utilized by control module 306 to perform a second drifting error correction during the control stage. In one embodiment, the second drifting error X2 may be calculated by multiplying the lateral drifting error X with a predetermined percentage. In a particular embodiment, the predetermined percentage is approximately 10%. Once X2 has been determined, X1 can be obtained based on X and X2.

The drifting error X2 to be utilized by control module 306 may be limited within predetermined range. In one embodiment, X2 is limited within a range of +/−10 centimeters (cm). If the X2 obtained by multiplying the predetermined percentage with X is greater than 10 cm, X2 is assigned with 10 cm. Likewise, if X2 is less than −10 cm, X2 is assigned with −10 cm. X1 can then be obtained by subtracting X2 from X: X1=X−X2. In one embodiment, prior to subtracting X2 from X, a smoothing operation is performed on the change of X2 between the currently calculated X2 and a prior X2 calculated during the last planning cycle. In performing the smoothing operation, a Kalman filter is applied to the X2 data.

Kalman filtering, also known as linear quadratic estimation (LQE), is an algorithm that uses a series of measurements observed over time, containing statistical noise and other inaccuracies, and produces estimates of unknown variables that tend to be more accurate than those based on a single measurement alone, by estimating a joint probability distribution over the variables for each timneframe. The Kalman filter uses a system's dynamics model (e.g., physical laws of motion), known control inputs to that system, and multiple sequential measurements (such as from sensors) to form an estimate of the system's varying quantities (its state) that is better than the estimate obtained by using only one measurement alone. As such, it is a common sensor fusion and data fusion algorithm.

Noisy sensor data, approximations in the equations that describe the system evolution, and external factors that are not accounted for all place limits on how well it is possible to determine the system's state. The Kalman filter deals effectively with the uncertainty due to noisy sensor data and to some extent also with random external factors. The Kalman filter produces an estimate of the state of the system as an average of the system's predicted state and of the new measurement using a weighted average. The purpose of the weights is that values with better (i.e., smaller) estimated uncertainty are "trusted" more. The weights are calculated from the covariance, a measure of the estimated uncertainty of the prediction of the system's state. The result of the weighted average is a new state estimate that lies between the predicted and measured state, and has a better estimated uncertainty than either alone. This process is repeated at every time step, with the new estimate and its covariance informing the prediction used in the following iteration. This means that the Kalman filter works recursively and requires only the last "best guess", rather than the entire history, of a system's state to calculate a new state.

Based on X1, referring back to FIG. 4, according to one embodiment as a part of drifting correction, a path generated during the planning stage is modified by planning module 305 based on X1. In one embodiment, in modifying at least the starting point of the path, planning module 305 projects or maps the path onto an SL space or SL map as an SL curve. The SL curve represents relative positions of the path points along the path relative to a reference line of a lane in which the ADV is driving. Then at least the starting point of the SL curve is shifted laterally based on X1. The shifted SL curve is then utilized to modify the path to compensate the drifting error X1 of the ADV.

Figure 5:
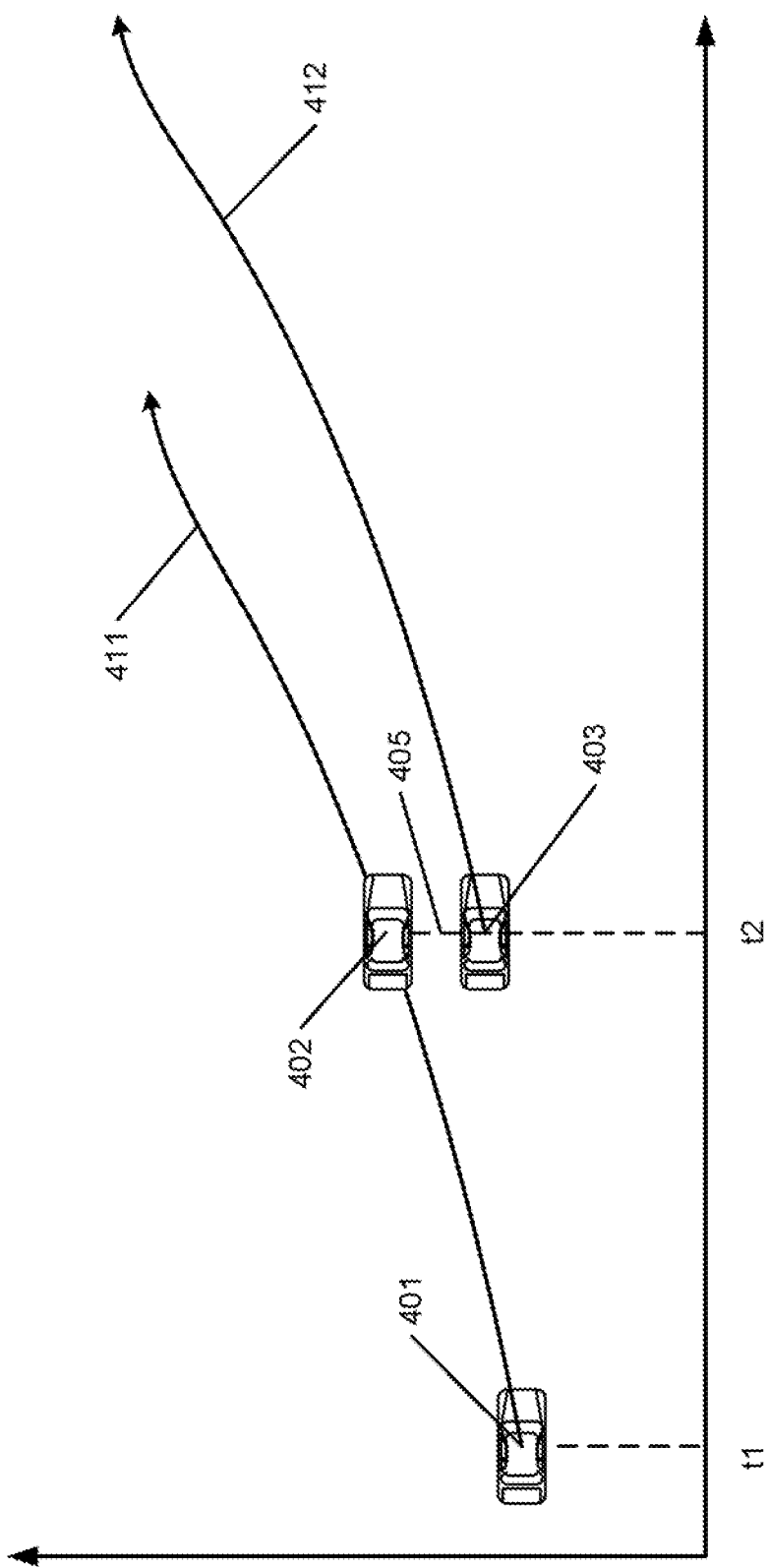
FIG. 5 is a diagram illustrating a process of optimizing a path with drifting compensation according to one embodiment.

Referring now to FIG. 5, for the purpose of illustration, it is assumed an ADV is at location 401 at time t1. At time t1, planning module 305 plans a first trajectory 411 for a first driving cycle. At the end of the first driving cycle, at time t2, planning module 305 is supposed to plan a new trajectory for a second driving cycle as the next driving cycle. Thus, at time t1, the ADV will be controlled to drive forward according to trajectory 411. At time t2, the ADV will be controlled to drive forward according to trajectory 412 and trajectory 411 will be discarded. At time t2, the ADV is expected at location 402 based on trajectory 411 of the first driving cycle. However, due to drifting, the ADV ends up at location 403 with drifting error 405. If the new trajectory is generated without considering drifting error 405, the new trajectory will be trajectory 412. As shown in FIG. 5, trajectory 411 for the first driving cycle starting at time t1 and trajectory 412 for the second driving cycle starting at time t2 are not smoothly connected due to drifting error 405. Such non-smooth connection of trajectories between two driving cycles may cause an unsafe and/or uncomfortable situation to the passengers.

According to one embodiment, when planning module 305 plans trajectory 412 at time t2, drifting correction module 308 is invoked to detect and calculate drifting error 405 based on the current location 403 of the ADV at time t2 and the expected location 402 of the ADV according to trajectory 411. The expected location 402 was determined when planning trajectory 411 during the first driving cycle as the prior driving cycle, which may be maintained and stored in a persistent storage device, for example, as part of driving statistics 313. In one embodiment, drifting correction module 308 calculates drifting error 405 based a difference (in meters) between the current location 403 of the ADV at time t2 and the expected location 402 of the ADV at time t2 according to trajectory 411.

In one embodiment, the drifting error 405 is calculated by subtracting the lateral coordinate of the actual location 403 ($L_{actual}$) from the lateral coordinate of the expected location 402 ($L_{expected}$). That is, drifting error 405=$L_{expected}$−$L_{actual}$. As shown in FIG. 4, drifting error 405 can be positive or negative. A positive value of drifting error 405 indicates that the actual location of the ADV is on the right side of the expected location of a prior driving cycle. A negative value of drifting error 405 indicates that the actual location of the ADV is on the left side of the expected location of the prior driving cycle.

Figure 6:
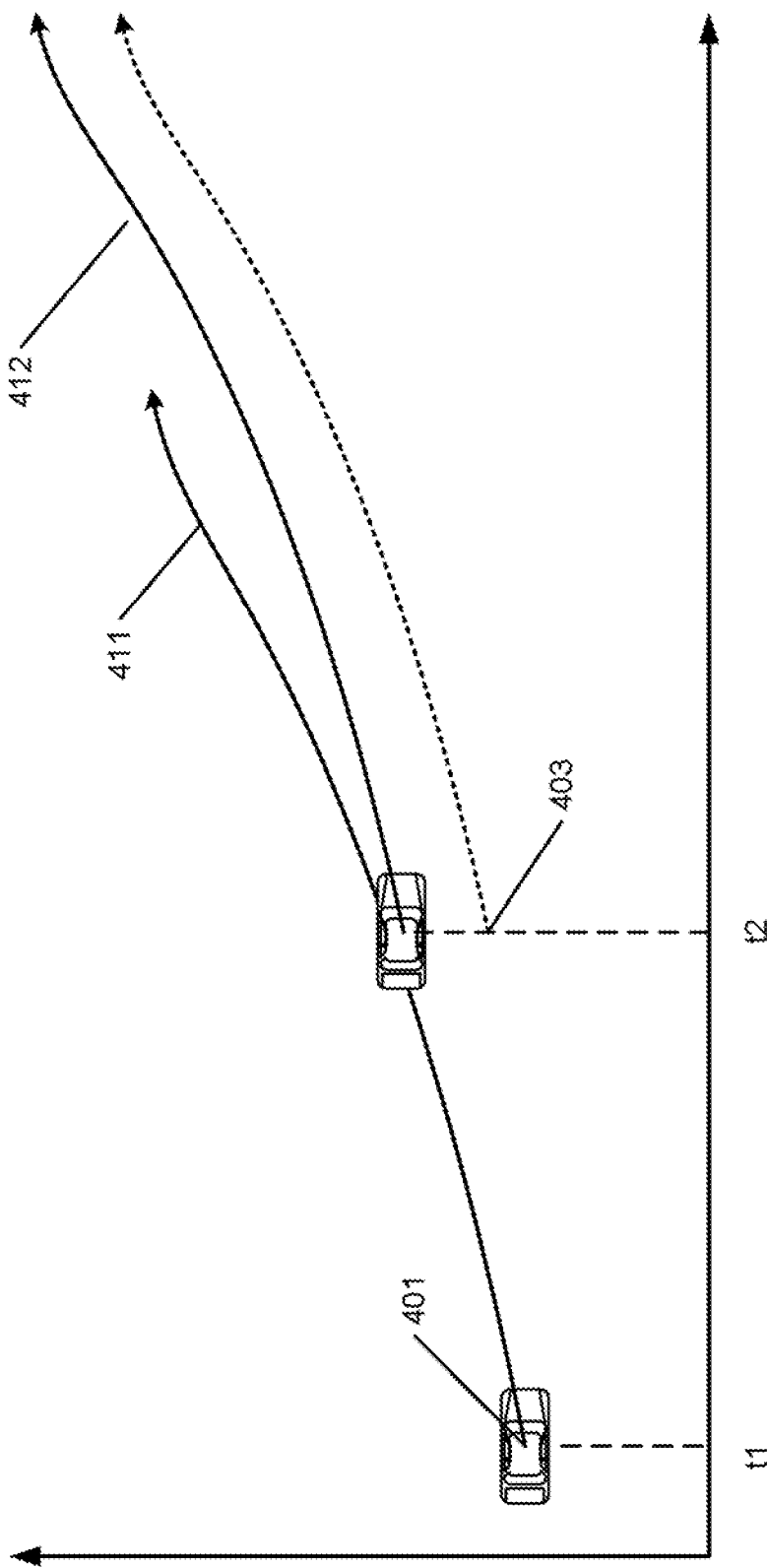
FIG. 6 is a diagram illustrating a process of determining drifting errors according to another embodiment.

Based on drifting error 405, according to one embodiment, drifting error 405 (e.g., X) is divided into first drifting error X1 and second drifting error X2 using a predetermined segmentation algorithm as described above. According to one embodiment, based on the drifting error X1, at least the starting point of trajectory 412 is shifted laterally to compensate the drifting error X1. For example, if the drifting error X1 indicates that the actual location 403 of the ADV is on the right side of the expected location 402 as shown in FIG. 5, at least the starting point of trajectory or the entire trajectory 412 is shifted to left based on the drifting error X1, as shown in FIG. 6. On the other hand, if the drifting error X1 indicates that the actual location 403 of the ADV is on the left side of the expected location 402, at least the starting point of trajectory or the entire trajectory 412 is shifted to right based on the drifting error X1.

Referring back to FIG. 4, according to one embodiment, based on the second drifting error X2, control module 306 performs a second drifting error correction during the control stage in view of the trajectory generated by planning module 305. For example, based on drifting error X2, control module 306 may issue a steering control command to modify the heading direction of the ADV to compensate the drifting error X2. For example, if the drifting error X2 indicates that the actual location 403 of the ADV is on the right side of the expected location, control module 306 may issue a steering control command to change the heading direction of the ADV towards left based on the drifting error X2. On the other hand, if the drifting error X2 indicates that the actual location of the ADV is on the left side of the expected location, control module 306 may issue a steering control command to modify the heading direction of the ADV towards right based on the drifting error X2.

Figure 7:
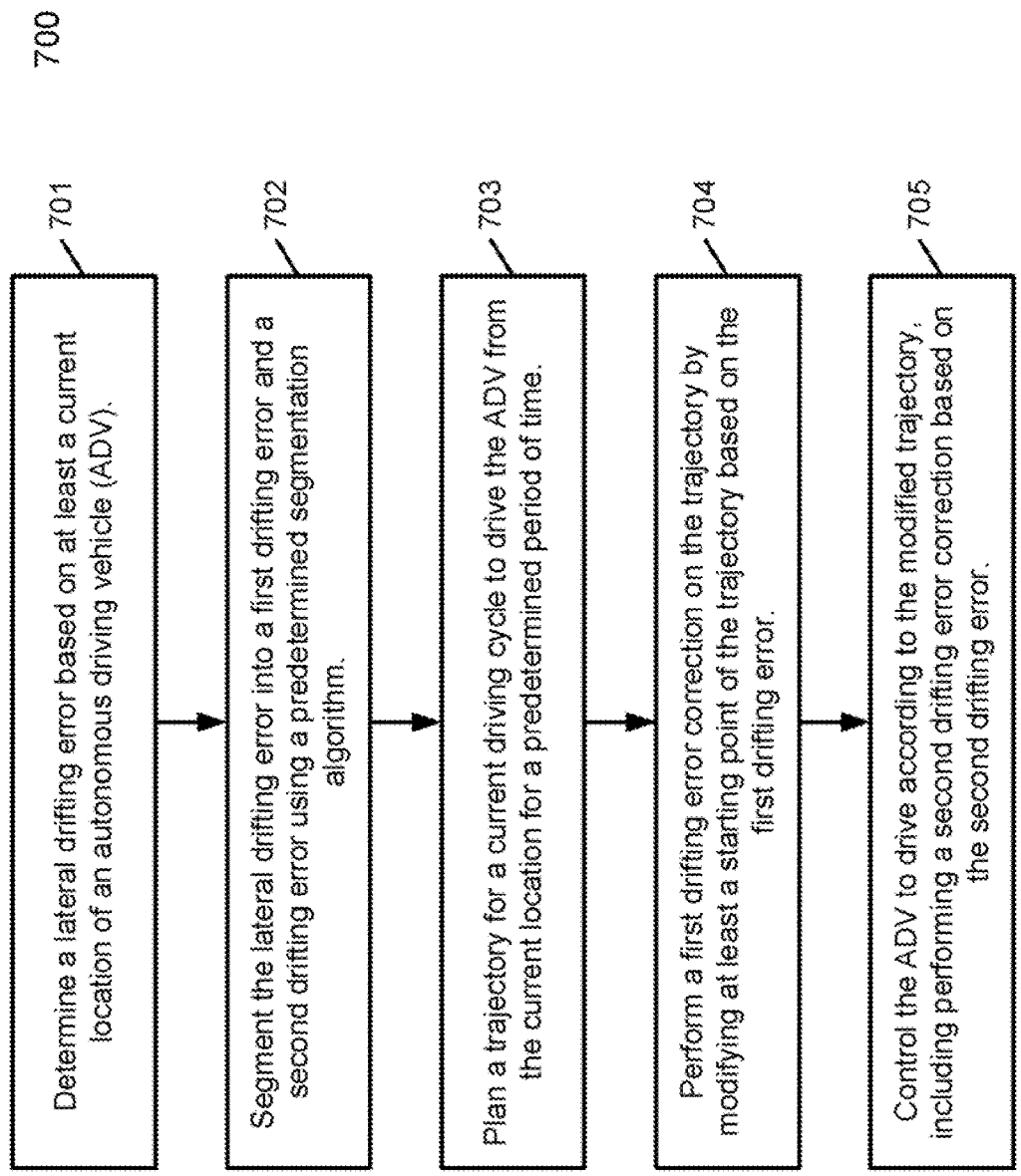
FIG. 7 is a flow diagram illustrating a process of performing drifting error correction according to one embodiment.

FIG. 7 is a flow diagram illustrating a process of determining and compensating drifting in operating an ADV according to one embodiment. Process 700 may be performed by processing logic which may include software, hardware, or a combination thereof. For example, process 700 may be performed by drifting correction module 308, planning module 305, and/or control module 306. Referring to FIG. 7, in operation 701, processing logic determines a lateral drifting error based on at least a current location of an ADV. The current location may be determined based on sensor data obtained from various sensors (e.g., LIDAR, RADAR, GPS, cameras). The lateral drifting error may be calculated based on a difference between the current location and an expected location that was determined during a previous driving cycle.

In operation 702, processing logic segments the lateral drifting error into a first drifting error and a second drifting error using a predetermined segmentation algorithm. In one embodiment, the second drifting error is obtained based on a predetermined percentage of the lateral drifting error. In addition, the second drifting error is limited within a predetermined range. Once the second drifting error has been determined, the first drifting error is then obtained, for example, by subtracting the second drifting error from the lateral drifting error. In operation 703 during a planning stage, a planning module plans a trajectory for a current driving cycle to drive the ADV from the current location for a predetermined period of time.

In operation 704, the planning module performs a first drifting error correction on the trajectory by modifying at least a starting point of the trajectory for the current driving cycle based on the first drifting error, generating a modified trajectory. For example, the planning module may shift at least the starting point or the entire trajectory laterally based on the first drifting error. In operation 705 during a control stage, a control module controls the ADV to drive according to the modified trajectory, including performing a second drifting error correction based on the second drifting error. In one embodiment, the control module may issue one or more steering control commands based on the second drifting error to modify the heading direction of the ADV in view of the trajectory provided by the planning module.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
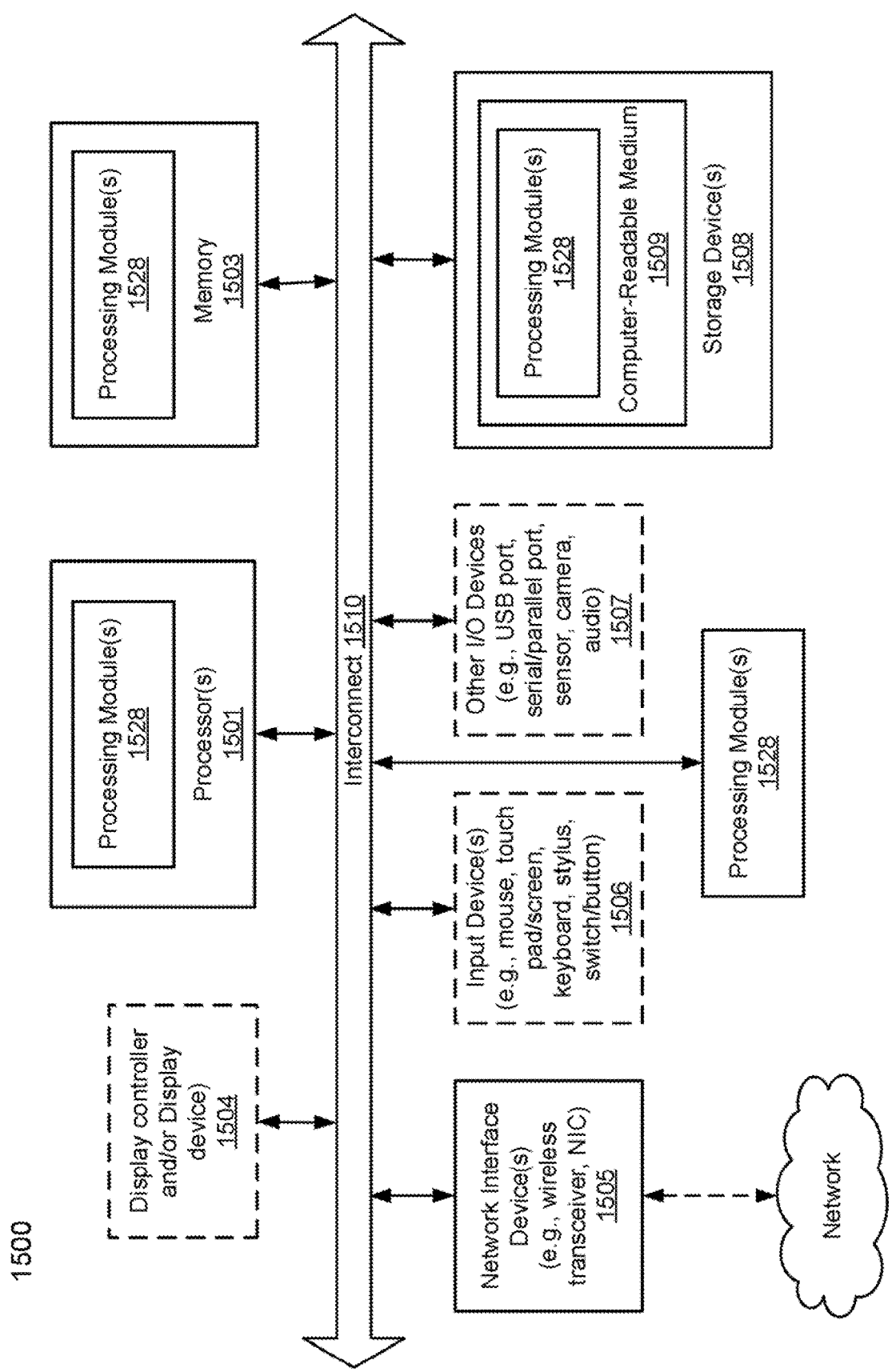
FIG. 8 is a block diagram illustrating a data processing system according to one embodiment.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and drifting correction module 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV) with drifting error correction, the computer-implemented method comprising:
   determining a lateral drifting error based on at least a current location of the ADV;
   segmenting the lateral drifting error into a first drifting error and a second drifting error using a predetermined segmentation algorithm, wherein segmenting the lateral drifting error into the first drifting error and the second drifting error comprises calculating the second drifting error based on a predetermined percentage of the lateral drifting error, and calculating the first drifting error in view of the lateral drifting error and the second drifting error;
   planning by a planning module a trajectory for a current driving cycle to drive the ADV from the current location for a predetermined period of time;
   performing by the planning module a first drifting error correction on the trajectory by modifying at least a starting point of the trajectory for the current driving cycle based on the first drifting error, generating a modified trajectory; and
   controlling by a control module the ADV to drive according to the modified trajectory, including performing a second drifting error correction based on the second drifting error.

2. The computer-implemented method of claim 1, wherein determining the lateral drifting error based on at least the current location of the ADV comprises:
   determining the current location of the ADV based on sensor data obtained from a plurality of sensors mounted on the ADV;
   determining an expected location of the ADV that was determined during a previous driving cycle; and
   calculating the lateral drifting error based on a difference between the current location and the expected location of the ADV.

3. The computer-implemented method of claim 1, wherein performing the second drifting error correction based on the second drifting error comprises:
   generating a steering control command based on the second drifting error from a reference point along the modified trajectory; and
   modifying a heading direction of the ADV based on the steering control command, such that the ADV moves according to the heading direction to compensate the second drifting error.

4. The computer-implemented method of claim 1, further comprising:
   determining whether the second drifting error is greater than a first predetermined threshold; and
   assigning the first predetermined threshold to the second drifting error when the second drifting error is greater than the first predetermined threshold.

5. The computer-implemented method of claim 4, further comprising:
   determining whether the second drifting error is less than a second predetermined threshold; and
   assigning the second predetermined threshold to the second drifting error when the second drifting error is less than the second predetermined threshold.

6. The computer-implemented method of claim 5, further comprising:
   performing a smoothing operation on the second drifting error in view of a previous corresponding second drifting error using a predetermined Kalman filter; and
   calculating the first drifting error by subtracting the second drifting error from the lateral drifting error.

7. The computer-implemented method of claim 5, wherein the first predetermined threshold is approximately 10 centimeters (cm) and wherein the second predetermined threshold is approximately −10 cm.

8. The computer-implemented method of claim 1, wherein the predetermined percentage is approximately 10%.

9. A non-transitory machine-readable medium having instructions stored therein, which when executed by a processor, cause the processor to perform operations of operating an autonomous driving vehicle (ADV), the operations comprising:
   determining a lateral drifting error based on at least a current location of the ADV;
   segmenting the lateral drifting error into a first drifting error and a second drifting error using a predetermined segmentation algorithm, wherein segmenting the lateral drifting error into the first drifting error and the second drifting error comprises calculating the second drifting error based on a predetermined percentage of the lateral drifting error, and calculating the first drifting error in view of the lateral drifting error and the second drifting error;
   planning by a planning module a trajectory for a current driving cycle to drive the ADV from the current location for a predetermined period of time;
   performing by the planning module a first drifting error correction on the trajectory by modifying at least a starting point of the trajectory for the current driving cycle based on the first drifting error, generating a modified trajectory; and
   controlling by a control module the ADV to drive according to the modified trajectory, including performing a second drifting error correction based on the second drifting error.

10. The non-transitory machine-readable medium of claim 9, wherein determining the lateral drifting error based on at least the current location of the ADV comprises:
    determining the current location of the ADV based on sensor data obtained from a plurality of sensors mounted on the ADV;
    determining an expected location of the ADV that was determined during a previous driving cycle; and
    calculating the lateral drifting error based on a difference between the current location and the expected location of the ADV.

11. The non-transitory machine-readable medium of claim 9, wherein performing the second drifting error correction based on the second drifting error comprises:
    generating a steering control command based on the second drifting error from a reference point along the modified trajectory; and
    modifying a heading direction of the ADV based on the steering control command, such that the ADV moves according to the heading direction to compensate the second drifting error.

12. The non-transitory machine-readable medium of claim 9, wherein the operations further comprise:
    determining whether the second drifting error is greater than a first predetermined threshold; and
    assigning the first predetermined threshold to the second drifting error when the second drifting error is greater than the first predetermined threshold.

13. The non-transitory machine-readable medium of claim 12, wherein the operations further comprise:

determining whether the second drifting error is less than a second predetermined threshold; and assigning the second predetermined threshold to the second drifting error when the second drifting error is less than the second predetermined threshold.

14. The non-transitory machine-readable medium of claim 13, wherein the operations further comprise:

performing a smoothing operation on the second drifting error in view of a previous corresponding second drifting error using a predetermined Kalman filter; and calculating the first drifting error by subtracting the second drifting error from the lateral drifting error.

15. A data processing system, comprising:

a processor; and a memory coupled to the processor to store instructions, which when executed by the processor, cause the processor to perform operations, the operations including determining a lateral drifting error based on at least a current location of an autonomous driving vehicle (ADV), segmenting the lateral drifting error into a first drifting error and a second drifting error using a predetermined segmentation algorithm, wherein segmenting the lateral drifting error into the first drifting error and the second drifting error comprises calculating the second drifting error based on a predetermined percentage of the lateral drifting error, and calculating the first drifting error in view of the lateral drifting error and the second drifting error, planning by a planning module a trajectory for a current driving cycle to drive the ADV from the current location for a predetermined period of time, performing by the planning module a first drifting error correction on the trajectory by modifying at least a starting point of the trajectory for the current driving cycle based on the first drifting error, generating a modified trajectory, and controlling by a control module the ADV to drive according to the modified trajectory, including performing a second drifting error correction based on the second drifting error.

16. The data processing system of claim 15, wherein determining the lateral drifting error based on at least the current location of the ADV comprises:

determining the current location of the ADV based on sensor data obtained from a plurality of sensors mounted on the ADV;

determining an expected location of the ADV that was determined during a previous driving cycle; and calculating the lateral drifting error based on a difference between the current location and the expected location of the ADV.

17. The data processing system of claim 15, wherein performing the second drifting error correction based on the second drifting error comprises:

generating a steering control command based on the second drifting error from a reference point along the modified trajectory; and modifying a heading direction of the ADV based on the steering control command, such that the ADV moves according to the heading direction to compensate the second drifting error.

18. The data processing system of claim 15, wherein the operations further comprise:

determining whether the second drifting error is greater than a first predetermined threshold; and assigning the first predetermined threshold to the second drifting error when the second drifting error is greater than the first predetermined threshold.

19. The data processing system of claim 18, wherein the operations further comprise:

determining whether the second drifting error is less than a second predetermined threshold; and assigning the second predetermined threshold to the second drifting error when the second drifting error is less than the second predetermined threshold.

20. The data processing system of claim 19, wherein the operations further comprise:

performing a smoothing operation on the second drifting error in view of a previous corresponding second drifting error using a predetermined Kalman filter; and calculating the first drifting error by subtracting the second drifting error from the lateral drifting error.

* * * * *